(12) United States Patent
Bruno et al.

(10) Patent No.: US 7,299,226 B2
(45) Date of Patent: Nov. 20, 2007

(54) CARDINALITY ESTIMATION OF JOINS

(75) Inventors: Nicolas Bruno, Redmond, WA (US);
Murali Krishna, Bellevue, WA (US);
Ming-Chuan Wu, Redmond, WA (US);
Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 10/465,148

(22) Filed: Jun. 19, 2003

(65) Prior Publication Data

US 2004/0260675 A1     Dec. 23, 2004

(51) Int. Cl.
*G06F 7/00*    (2006.01)
*G06F 17/30*   (2006.01)
(52) U.S. Cl. .................... 707/5; 707/6; 707/7
(58) Field of Classification Search ............ 707/2, 707/5, 6, 7
See application file for complete search history.

(56) References Cited

U.S. PATENT DOCUMENTS 6,865,567 B1 *  3/2005  Oommen et al. ............ 707/2

OTHER PUBLICATIONS

Nicolas Bruno & Surajit Chaudhuri, "Exploiting Statistics on Query Expressions for Optimization", ACM SIGMOD Jun. 4-6, 2002, Madison, Wisconsin, USA.*
Nicolas Bruno, "Automatic Management of Statictics on Query Expression in Relational Databases", Department of Computer Science, Columbia University, Apr. 25, 2002, New York, NY.*
Nicolas Bruno, Surajit Chaudhuri, Luis Gravano; "STHoles: a Multidimensional Workload-Aware Histogram"; ACM SIGMOD May 21-24, 2001; Santa Barbara, California, USA.*
P.G. Selinger, M.M. Astrahan, D.D. Chamberlin, R.A. Lorie, T.G. Price: Access Path Selection in a Relational Database Management System, *In Proceedings of the 1979 ACM Int'l Conference on Management of Data* (SIGMOD '79), 1979.
H. Garcia-Molina, J.D. Ullman and Jennifer Widom. *Database System Implementation* Prentice Hall, 2000. (Section 7.4.4).

* cited by examiner

*Primary Examiner*—Shahid Alam
*Assistant Examiner*—Giovanna B. Colan

(57) ABSTRACT

A method of estimating cardinality of a join of tables using multi-column density values and additionally using coarser density values of a subset of the multi-column density attributes. In one embodiment, the subset of attributes for the coarser densities is a prefix of the set of multi-column density attributes. A number of tuples from each table that participate in the join may be estimated using densities of the subsets. The cardinality of the join can be estimated using the multi-column density for each table and the estimated number of tuples that participate in the join from each table.

20 Claims, 6 Drawing Sheets

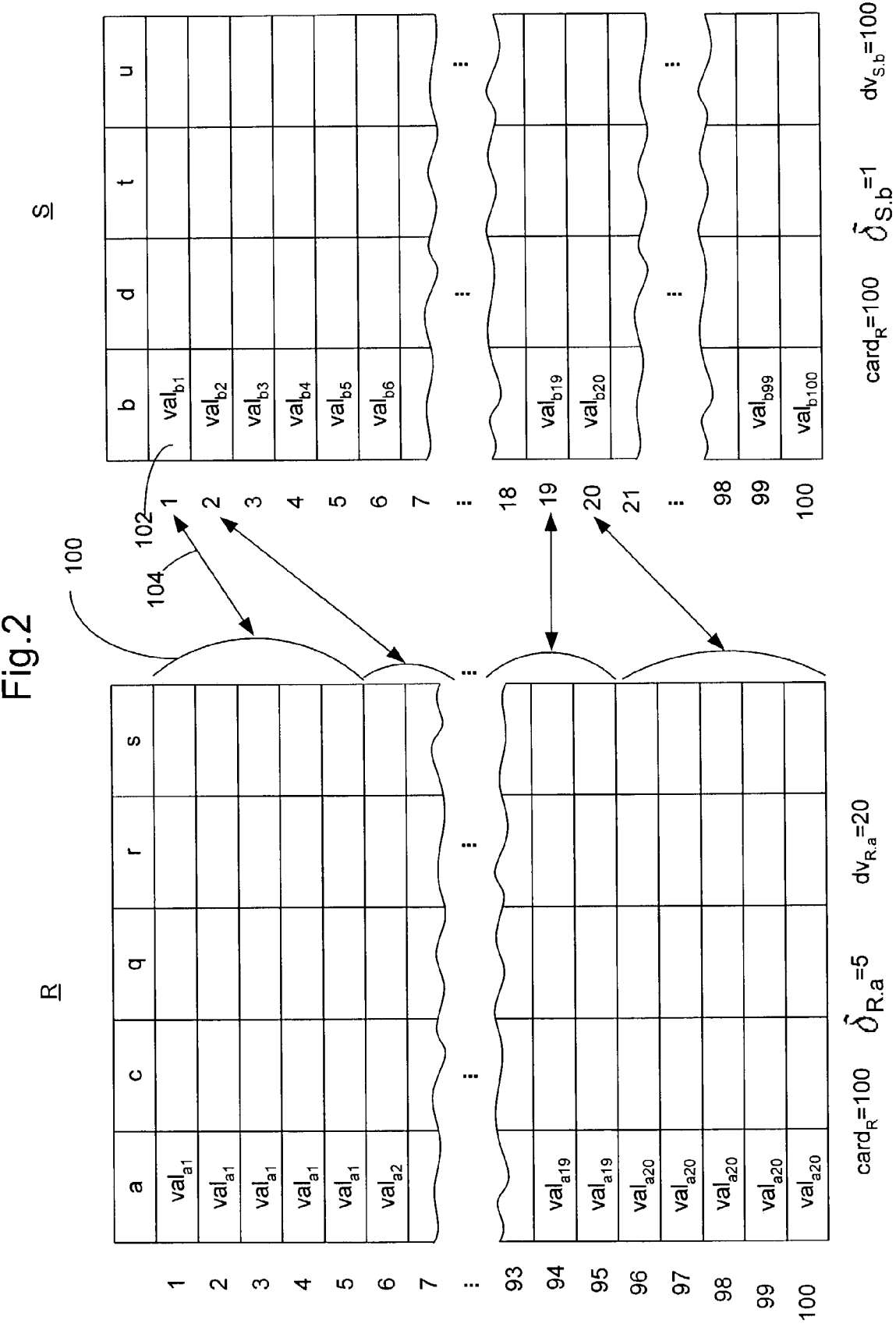

| | a | c | w | x |
|---|---|---|---|---|
| 1 | $val_{a1}$ | $val_{c1}$ | | |
| 2 | $val_{a1}$ | $val_{c1}$ | | |
| 3 | $val_{a1}$ | $val_{c1}$ | | |
| 4 | $val_{a1}$ | $val_{c1}$ | | |
| 5 | $val_{a1}$ | $val_{c1}$ | | |
| 6 | $val_{a1}$ | $val_{c1}$ | | |
| 7 | $val_{a1}$ | $val_{c1}$ | | |
| 8 | $val_{a1}$ | $val_{c1}$ | | |
| 9 | $val_{a1}$ | $val_{c1}$ | | |
| 10 | $val_{a1}$ | $val_{c1}$ | | |
| 11 | $val_{a1}$ | $val_{c2}$ | | |
| 12 | | | | |
| ⋮ | ⋮ | ⋮ | | |
| 99 | | | | |
| 100 | $val_{a1}$ | $val_{c10}$ | | |
| 101 | $val_{a2}$ | $val_{c11}$ | | |
| 102 | | | | |
| ⋮ | ⋮ | ⋮ | | |
| 998 | | | | |
| 999 | $val_{a10}$ | $val_{c100}$ | | |
| 1000 | $val_{a10}$ | $val_{c100}$ | | |

$card_R = 1000$ $\delta_{R.a,c} = 10$  $\delta_{R.a} = 100$ $dv_{R.a,c} = 100$  $dv_{R.a} = 10$

S

| | b | d | y | z |
|---|---|---|---|---|
| 1 | $val_{b1}$ | $val_{d1}$ | | |
| 2 | $val_{b1}$ | $val_{d2}$ | | |
| 3 | $val_{b1}$ | $val_{d3}$ | | |
| 4 | $val_{b1}$ | $val_{d4}$ | | |
| 5 | $val_{b1}$ | $val_{d5}$ | | |
| 6 | $val_{b1}$ | $val_{d6}$ | | |
| 7 | $val_{b1}$ | $val_{d7}$ | | |
| 8 | $val_{b1}$ | $val_{d8}$ | | |
| 9 | $val_{b1}$ | $val_{d9}$ | | |
| 10 | $val_{b1}$ | $val_{d10}$ | | |
| 11 | $val_{b1}$ | $val_{d11}$ | | |
| 12 | | | | |
| ⋮ | ⋮ | ⋮ | | |
| 499 | | | | |
| 500 | $val_{b1}$ | $val_{d500}$ | | |
| 501 | $val_{b2}$ | $val_{d1}$ | | |
| 502 | | | | |
| ⋮ | ⋮ | ⋮ | | |
| 998 | | | | |
| 999 | $val_{b2}$ | $val_{d499}$ | | |
| 1000 | $val_{b2}$ | $val_{d500}$ | | |

$card_S = 1000$ $\delta_{R.b,d} = 10$  $\delta_{S.b} = 500$ $dv_{R.b,d} = 1000$  $dv_{S.b} = 2$

CARDINALITY ESTIMATION OF JOINS

FIELD OF THE INVENTION

The present disclosure concerns a method of estimating cardinality of a join of tables using multi-column density values, and more particularly, the present disclosure relates to a method of estimating cardinality of a join of tables using multi-column density values and additionally using coarser density values of a subset of the multi-column density attributes.

BACKGROUND ART

Relational databases systems allow a database user to enter queries into the database and return the data that meets the conditions of the query. The data present within the database system is in one or more tables or relations. Each relation consists of a number of records or tuples containing specific information possibly grouped in some ordered sequence. Each tuple consists of one or more fields called attributes. In any single attribute of a tuple there can be only a single value. However, each tuple can have a different value for the same attribute.

Some characteristics of a database relation are typically maintained. For example, the database system may maintain the cardinality, the density and the number of distinct values of each relation. Cardinality is the number of tuples or records in a relation. The number of distinct values is the number of distinct values of a given attribute or set of attributes. The density is the average number of tuples per distinct value.

One operation performed by a database system is known as a join operation. A join operation is used to combine related tuples from two relations into single tuples. Typically, the join operation matches tuples from two relations on the values taken from each relation on a common attribute and creates a joined table or relation. If another relation needs to be joined with the result relation, the result relation may be referred to as an intermediate relation because it is created in the process of generating a result relation.

Another operation performed by a database system is the select operation. The select operation is used to select a subset of tuples from a relation that satisfy a selection condition. One can consider the select operation to be a filter that keeps only those tuples that satisfy a qualifying condition.

A query entered into a relational database system may result in multiple operations being performed. For example, selection operations on one or more relations can be used together with multiple join operations in the same query. In many cases, the operations of the query can be performed in several different orders without changing the result of the query. Each possible order of operations is referred to as a query execution plan. There may be several alternative query execution plans, each specifying a set of operations to be executed by the database system. Each different query execution plan will have a different "cost." The costs may include the cost of accessing secondary storage, computation cost, memory usage cost, and communication cost.

Relational database systems typically include a component called a query optimizer. The query optimizer may identify several query execution plans, estimate the cost of each different query execution plan, and select the plan with the lowest estimated cost for execution. Query plans generated for a query will differ in their total cost of obtaining the desired data. The query optimizer evaluates these cost estimates for each query plan in order to determine which plan is likely to have the lowest execution cost.

The join operation can be quite expensive, since joining together two or more entire relations can result in a very large relation. When multiple joins are present in a query, the cost of a bad execution plan may increase dramatically. It is important for the query optimizer to identify a query execution plan that minimizes cost. The join ordering chosen by the query optimizer is often a key factor in the ultimate cost of the query execution plan.

In view of these considerations, query optimizers often use estimates of the cardinality of joins in attempting to select the most efficient query plan. It may be desirable to estimate the cardinality of the join of a table R with a table S where attribute a of table R is equal to attribute b of table S, denoted $R\bowtie_{R.a=S.b}S$. One prior art method of estimating the cardinality of such a join relied on what is referred to as the "containment assumption." According to the containment assumption, each group of distinct valued tuples belonging to the relation with the minimal number of distinct values joins with some group of distinct valued tuples in the other table. The containment assumption has been extended to estimate the cardinality of a multi-predicate join. One problem with an existing method of estimating the cardinality of a multi-predicate using the containment assumption join is that cardinality is often overestimated.

There is a need for a method of estimating cardinality using multi-column density values and additionally using coarser density values of a subset of the multi-column density attributes to reduce the overestimation problem.

SUMMARY

The present disclosure concerns a method of estimating cardinality of a join of tables using multi-column density values and additionally using coarser density values of a subset of the multi-column density attributes. In one embodiment, the sequence of attributes for the coarser densities is a prefix of the sequence of multi-column density attributes.

In one embodiment of the method, a multi-column density over a set of attributes is identified for each table. A density of a subset of the set of attributes is also identified for each table. In this embodiment, a number of tuples from each table that participate in the join is estimated using densities of the subsets. The cardinality of the join is estimated using the multi-column density for each table and the estimated number of tuples that participate in the join from each table.

In one embodiment of the method, a multi-column density over a set of attributes and a cardinality is identified for each table. A density of a subset of the set of attributes is also identified for each table. The cardinality of the join is estimated using the multi-column density for each table, the density of said subset of said set of attributes for each table, and the cardinality of each table.

In one embodiment, the method improves an existing method of estimating cardinality of a join of tables using a multi-column density over a set of attributes. The method improves the existing method by additionally using a density of a subset of the set of multi-column density attributes for each table to estimate the cardinality of the join.

The number of tuples from each table that participate in the join may be estimated by multiplying an estimated minimum number of distinct values for the subset of attributes and a density of the subset of attributes in the table. The number of distinct values of a subset of attributes can be calculated by dividing the cardinality of the table by the density of the subset of attributes in the table.

In one embodiment, the join cardinality estimation is calculated by selecting the minimum of an estimated number of tuples from a first table that participate in the join divided by a multi-column density over a set of attributes for the first table and an estimated number of tuples from a second table that participate in the join divided by a multi-column density over a set of attributes for the second table. This minimum, the multi-column density for the first table, and the multi-column density for the second table are multiplied to calculate the estimated cardinality of the join.

In one embodiment, the cardinality estimation is calculated by identifying a first minimum value of a cardinality of a first table divided by a density of a subset of the set of multi-column density attributes for the first table and a cardinality of a second table divided by a density of a subset of the set multi-column density attributes for the second table. The method also identifies a second minimum value of the density of the subset of the set of multi-column density attributes for the first table divided by a multi-column density over the set of multi-column density attributes for the first table and the density of the subset of the set of multi-column density attributes for the second table divided by a multi-column density over the set of attributes for the second table. The first minimum value, the second minimum value, the multi-column density over the set of attributes for the first table, and the multi-column density over the set of attributes for the second table are multiplied to calculate the estimated cardinality of the join.

These and other objects, advantages, and features of an exemplary embodiment are described in conjunction with the accompanying drawings.

BRIEF DESCRIPTION OF THE DRAWINGS

FIG. 2 is illustrates a method of estimating the cardinality of a join of two relations using single column densities;

FIG. 3A illustrates a method of estimating the cardinality of a join of two relations using multi-column densities;

DETAILED DESCRIPTION

Exemplary Operating Environment

Figure 1:
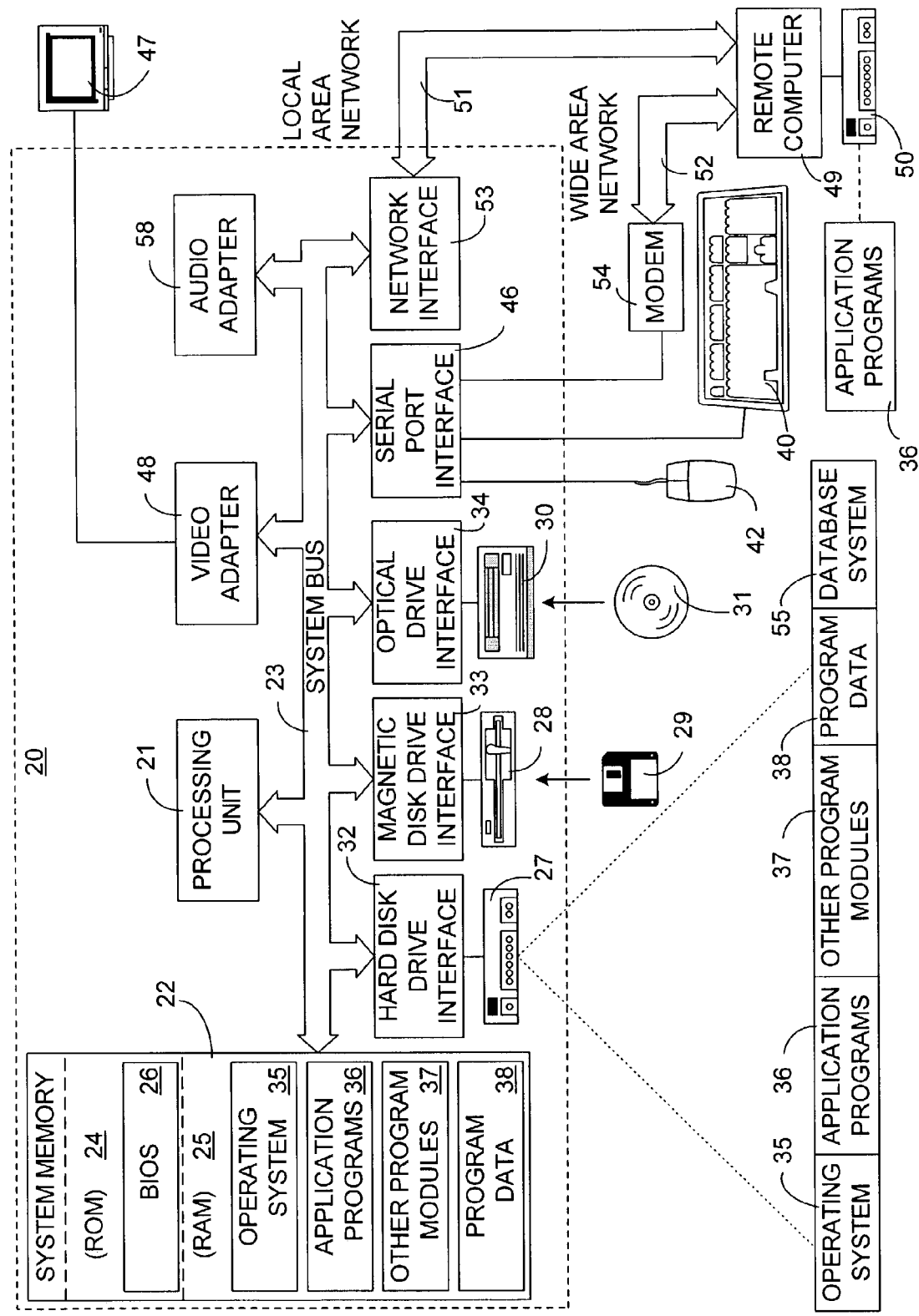
FIG. 1 is a schematic depiction of a computer system used in practicing an exemplary embodiment of the disclosed method.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 24 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk 27, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk 27, magnetic disk 29, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a widearea network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage, device 50. It will be appreciated that the network connections shown are exemplary and other means of establishing a communications link between the computers may be used.

Notation

In this disclosure, tables are represented by uppercase letters. For example, tables may be represented by uppercase letters R; S; T . . . Table attributes are represented by lowercase letters. For example, table attributes may be represented by lowercase letters a; b; c . . . The cardinality of a table R is denoted as $card_R$ or $|R|$. For a given attribute a of table R, the density of attribute a in table R, denoted $\delta_{R.a}$, is the average number of duplicates per distinct value of attribute a in R. The number of distinct values of attribute a in table R is denoted $dv_{R.a}$. As a result, $dv_{R.a} = card_R/\delta_{R.a}$.

A multi-column density MCD for attributes $a_1, \ldots, a_n$ of table R is denoted as $\delta_{R.a1, \ldots, an}$. The multi-column density $\delta_{R.a1, \ldots, an}$ is the average number of duplicates per distinct combination of attributes $a_1, \ldots, a_n$. In this disclosure, the number of distinct combinations of $a_1, \ldots, a_n$ in table R are denoted as $dv_{R.a1, \ldots, an}$. As such, the number of distinct attribute combinations $dv_{R.a1, \ldots, an} = card_R/\delta_{R.a1, \ldots, an}$. It is assumed in this disclosure that whenever multi-column densities are available over attributes $a_1, \ldots, a_n$ the densities of prefix subsets of the original multi-column density are also available. For the multi-column density of $a_1, \ldots, a_n$ the densities of the prefixes: $(a_1)$, $(a_1, a_2)$; $(a_1, a_2, a_3)$, . . . , $(a_1, a_2, \ldots, a_{n-1})$ are also available.

Join Estimation Using Containment Assumptions

The cardinality of the join of table R with table S where attribute a of table R is equal to attribute b of table S is denoted $R \bowtie_{R.a=S.b} S$. According to the containment assumption, each group of distinct valued tuples belonging to the relation with the minimal number of distinct values joins with some group of distinct valued tuples in the other table. This is illustrated by the example of FIG. 2. In the example of FIG. 2 table R has a cardinality $card_R=100$, there are twenty distinct values of attribute a $dv_{R.a}=20$ and therefore, the density of attribute a is $\delta_{R.a}=5$. Table S has a cardinality $card_S=100$, there are one hundred distinct values of attribute b $dv_{S.b}=100$ (all values of b are different in the example), and therefore, the density of attribute b is $\delta_{S.b}=1$. Applying the containment assumption to the example of FIG. 2, relation R has the fewest number groups with distinct values, i.e. 20 groups. The containment assumption assumes that each group of distinct valued tuples of table R join with a group of distinct valued tuples in table S, which in the example is a single tuple in S. The arrows 104 between table R and table S illustrate this. According to the containment assumption, a group 100 of tuples (five tuples in the example) with attribute a having a value $val_{a1}$ will join with a group 102 of tuples (one tuple in the example) with attribute b having a value $val_{b1}$ as indicated by arrow 104. Similarly the groups of tuples from relation R having values $val_{a2}, \ldots, val_{a20}$ will join with groups of tuples from relation S having values $val_{a2}, \ldots, val_{a20}$ respectively. Note in the example of FIG. 2 that groups (single tuples in the example) 21-100 of table S do not participate in the join.

Using the containment assumption, an estimated cardinality of the join is calculated as:

$$^{card}R\bowtie_{R.a=S.b}S = \min\left(\frac{card_R}{\delta_{R.a}}, \frac{card_S}{\delta_{S.b}}\right) \cdot \delta_{R.a} \cdot \delta_{S.b} \quad \text{Equation 1}$$

Applying Equation 1 to the example of FIG. 2, the estimated cardinality of the join $$R\bowtie_{R.a=S.b}S \text{ is} := \min(dv_{R.a} = 20, dv_{S.b} = 100)(\delta_{R.a} = 5)(\delta_{S.b} = 1)$$
$$= (20)(5)(1) = 100$$

Considering the multi-predicate join of table R with table S where attribute a of table R is equal to attribute b of table S and attribute c of table R is equal to attribute d of table S, denoted $R\bowtie_{R.a=S.b \wedge R.c=S.d}S$. The estimation calculation of Equation 1 can be extended to this multi-predicate join to define the estimated cardinality of the multi-predicate join as:

$$^{card}R\bowtie_{R.a=S.b \wedge R.c=S.d}S = \min\left(\frac{card_R}{\delta_{R.a,c}}, \frac{card_S}{\delta_{S.b,d}}\right) \cdot \delta_{R.a,c} \cdot \delta_{S.b,d} \quad \text{Equation 2}$$

This estimation is correct under the containment assumption in absence of additional information, such as partial densities. If the densities of the prefixes of the multi-column densities (e.g., $\delta_{R.a}, \delta_{R.b}$) are also available, the estimation of Equation 2 could be an overestimate of the cardinality. The example illustrated by FIG. 3 shows how use of Equation 2 can overestimate cardinality.

Figure 3B:
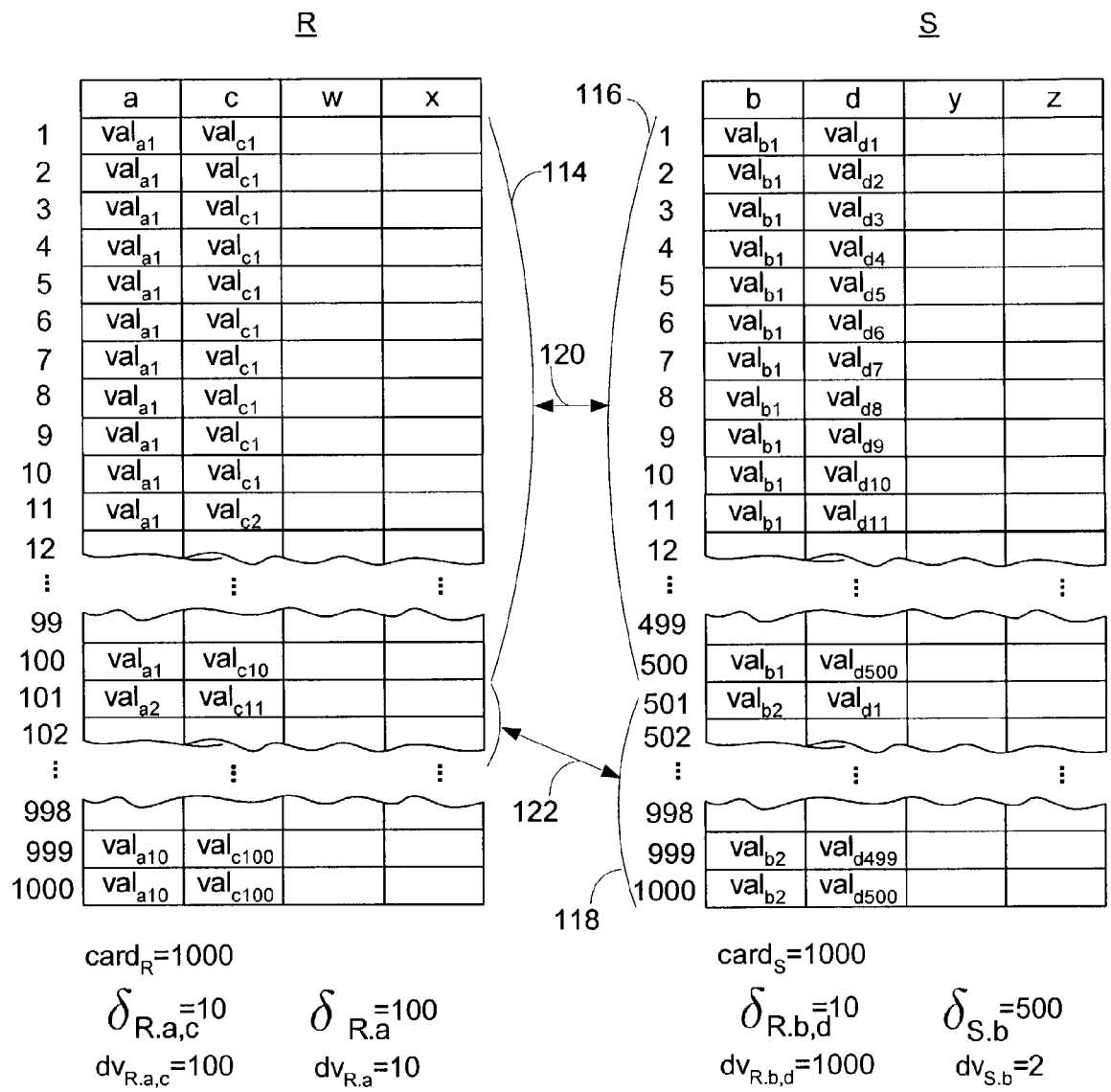
FIG. 3B illustrates a method of estimating the cardinality of a join of two relations using multi-column densities.

FIGS. 3A and 3B illustrate the join predicate $R\bowtie_{R.a=S.b \wedge R.c=S.d}S$. Suppose $card_R=1000$, $card_S=1000$ and that $\delta_{R.a,c}=10$ and $\delta_{R.b,d}=1$. Referring to FIG. 3A, there are 100 groups of tuples with distinct values $dv_{R.a,c}$ of the combination of attributes a and c and there are 1000 groups of tuples (1 tuple per group in the example) with distinct values $dv_{S.b,d}$ In FIG. 3A, according to Equation 2, a group 108 of ten tuples with attribute a having a value $val_{a1}$ and attribute c having a value $val_{c1}$ will join with a group 110 of tuples (one tuple in the example) with attribute b having a value $val_{b1}$ and attribute d having a value $val_{d1}$ as indicated by arrow 112 Similarly the ninety-nine remaining groups of ten tuples with the same value on attributes a and c from relation R will join with one tuple from relation S. Therefore, using the containment assumption the estimated cardinality according to Equation 2 is:

$$\min\left(\frac{card_R}{\delta_{R.a,c}};\ \frac{card_S}{\delta_{S.b,d}}\right)\cdot\delta_{R.a,c}\cdot\delta_{S.b,d} = \min(dv_{R.a,c} = 1000/10,\ dv_{S.b,c} = 1000/1)(\delta_{R.a,c} = 10)(\delta_{S.b,d} = 1)$$

$$\min(100, 1000)*10*1 = 100*10 = 1000.$$

Using Coarser Densities to Reduce Overestimation

Using Equation 2 in the Example of FIGS. 3A and 3B assumes that all tuples from R join with some tuple in S, since $dv_{R.a,c}=100<1000=dv_{R.b,d}$. Suppose that in the example of FIGS. 3A and 3B, the following additional density information about a subset of the attributes of the multi-column density is also available: $\delta_{R.a}=100$ and $\delta_{S.b}=500$. These are the densities of the prefixes of the multi-column densities $\delta_{R.a,c}$ and $\delta_{R.b,d}$. These densities of the prefixes allow the table R to be modeled as consisting of ten groups ($dv_{R.a}$) of one-hundred tuples each ($\delta_{R.a}$) where each item in a group has the same attribute value R.a. Referring to FIG. 3B, a first group 114 of one-hundred tuples is modeled as having value $val_{a1}$ in the example. In FIG. 3B, the remaining nine groups of one-hundred tuples have values $val_{a2}, \ldots, val_{a10}$. The prefix densities allow table S to be modeled as consisting of two groups 116, 118 ($dv_{S.b}$) of 500 tuples each ($\delta_{S.b}$), where each member of a group has the same attribute value S.b. In FIG. 3B, the first group 116 of five-hundred tuples is illustrated as having value $val_{b1}$ and the second group 118 of five-hundred tuples is illustrated as having value $val_{b2}$. This information does not contradict the original multi-column densities. Rather, this information simply models a coarser distribution for table R (i.e. a GROUP BY R.a of the different combinations of R.a, R.c). In FIG. 3B, arrows 120, 122 illustrate that at most two out of the ten groups of table R (grouped by R.a alone) would match with tuples in table S, since there are only two groups with different values of attribute S.b. Therefore, the remaining 8 groups in table R (80% of the tuples in R) would not participate in a match, which is a great restriction over the first calculation that uses only the original multi-column densities.

Figure 4:
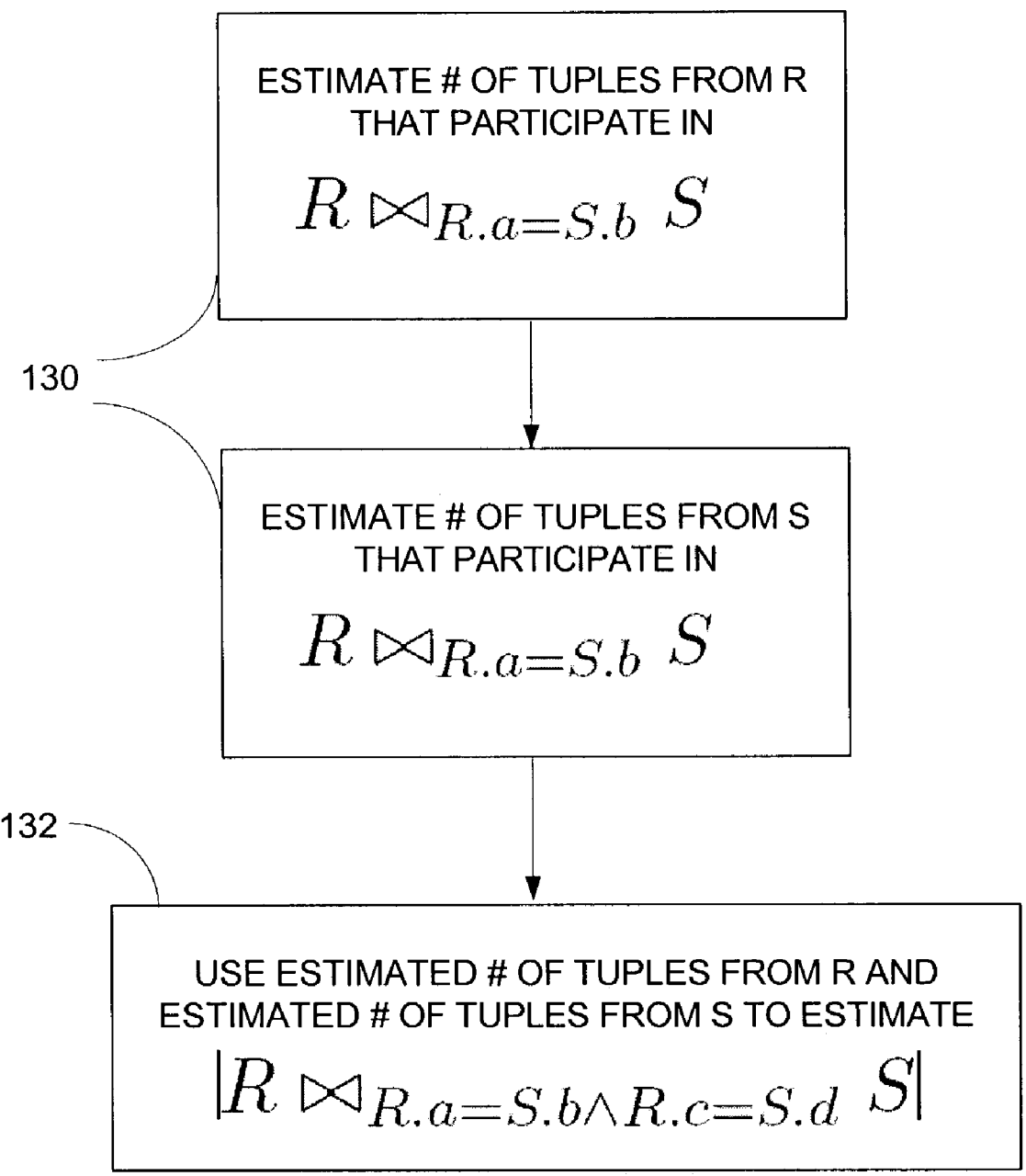
FIG. 4 is a flow chart that illustrates a method of estimating cardinality of a join of two relations using multi-column densities and densities of subsets of multi-column density attributes.

In one embodiment, the multicolumn density $\delta_{R.a,c}$, the multi-column density $\delta_{R.b,d}$, and the density information $\delta_{R.a}, \delta_{R.b}$, about a prefix subset of the multi-column density attributes is also available. This density information can be used to estimate the cardinality of $R\bowtie_{R.a=S.b \wedge R.c=S.d}S$ by using a two-step approach. This two-step approach is illustrated by FIG. 4. In the exemplary embodiment, the method first estimates 130 how many tuples from R and S participate in the simpler join $R\bowtie_{R.a=S.b}S$ using the containment assumption and the coarser subset density information $\delta_{R.a}$ and $\delta_{S.b}$. The estimated number of tuples in table R that participate in the simpler join $R\bowtie_{R.a=S.b}S$ is:

$$\min\left(\frac{card_R}{\delta_{R.a}},\ \frac{card_S}{\delta_{S.b}}\right)\cdot\delta_{R.a}. \quad \text{Equation 3}$$

Analogously, the number of tuples in S that participate in this simpler join is:

$$\min\left(\frac{card_R}{\delta_{R.a}},\ \frac{card_S}{\delta_{S.b}}\right)\cdot\delta_{S.b}. \quad \text{Equation 4}$$

In a second step, the cardinality of the original join $R\bowtie_{R.a=S.b \wedge R.c=S.d}S$ is estimated 132 using the estimated number tuples from R and S that participate in the simpler join $R\bowtie_{R.a=S.b}S$ (using the Equations 3 and 4) instead of the cardinality of R $card_R$ and the cardinality of S $card_S$. The observation is that any tuple from table R or table S that does not participate in the simpler join will not participate in the original join, since the latter contains an additional equality predicate. Therefore, in the exemplary embodiment the method replaces the actual cardinalities $card_R$ and $card_S$ in estimation Equation 2 with the estimated number of tuples from table R and table S that participate in the simpler join defined by Equations 3 and 4 respectively. In this way, the method removes from table R and table S tuples that are do not to participate in the join when the containment assumption is applied. This assumes that the values of densities $\delta_{R.a,c}$ and $\delta_{S.b,d}$ are unchanged after removing the tuples that do not participate in the join. The resulting estimation equation is:

$$card\,R\bowtie_{R.a=S.b \wedge R.c=S.d}S = \left(\frac{\min\left(\frac{card_R}{\delta_{R.a}}\cdot\frac{card_S}{\delta_{S.b}}\right)\cdot\delta_{R.a}}{\delta_{R.a,c}},\right.$$

$$\left.\frac{\min\left(\frac{card_R}{\delta_{R.a}};\ \frac{card_S}{\delta_{S.b}}\right)\cdot\delta_{S.b}}{\delta_{S.b,d}}\right)\cdot\delta_{R.a,c}\cdot\delta_{S.b,d}. \quad \text{Equation 5}$$

By extracting the common factor $$\min\left(\frac{card_R}{\delta_{R.a}},\ \frac{card_S}{\delta_{S.b}}\right)$$

Equation 5 reduces to:

$$card\,R\bowtie_{R.a=S.b \wedge R.c=S.d}S = \quad \text{Equation 6}$$

$$\min\left(\frac{card_R}{\delta_{R.a}},\ \frac{card_S}{\delta_{S.b}}\right)\cdot\min\left(\frac{\delta_{R.a}}{\delta_{R.a,c}}\cdot\frac{\delta_{S.b}}{\delta_{S.b,d}}\right)\cdot\delta_{R.a,c}\cdot\delta_{S.b,d}.$$

If the densities of the other prefixes are available from the construction of the original multi-column densities i.e., densities $\delta_{R.c}, \delta_{R.c,a}, \delta_{S.d}, \delta_{S.d,b}$ using the arguments applied above, the cardinality $R\bowtie_{R.a=S.b \wedge R.c=S.d}S$ can be estimated by Equation 7.

$$^{card}R\bowtie_{R.a=S.b \wedge R.c=S.d} S = $$
$$\min\left(\frac{card_R}{\delta_{R.c}}, \frac{card_S}{\delta_{S.d}}\right) \cdot \min\left(\frac{\delta_{R.c}}{\delta_{R.c,a}}, \frac{\delta_{S.d}}{\delta_{S.d,b}}\right) \cdot \delta_{R.c,a} \cdot \delta_{S.d,b}.$$

Equation 7

The two estimations returned using Equations 6 and 7 can be different. In such a case, since all these estimations are estimated upper bounds for the join, the exemplary method takes the minimal one estimate.

In one embodiment, Equation 7 is generalized for any number n (greater than 2) of equalities in the join predicate, by recursively applying the method described above. In general, for a join with a number n predicates there can be n! (n factorial) different permutations of multi-column densities and subsets of prefixes. If all of the densities are available, the method selects the minimum estimation of the cardinality in one embodiment. However, in one embodiment only a selected number of the possible estimations are calculated. This may be done either to be efficient or because not all combinations of the multi-column densities are available. Regardless of how many of the possible estimations are calculated using the disclosed method, the disclosed estimation method guarantees that the minimal value among the estimations is at least as accurate as the estimation obtained if the single multi-column densities were just used by themselves in Equation 2.

Situations When Using Coarser Subset Densities Reduces Overestimation

Equation 6 has the following basic form:

min(a1/b1, a2/b2)*min(b1/c1, b2/c2)*c1*c2. where:

a1=$card_R$
a2=$card_S$
b1=$\delta_{R.a}$
b2=$\delta_{S.b}$
c1=$\delta_{R.a,c}$
c2=$\delta_{S.b,d}$ Original estimation equation 2, which does not consider the coarser densities has the following basic form:

min(a1/c1, a2/c2)*c1*c2.

If a1/b1<a2/b2 and b1/c1<b2/c2, i.e., both min operators of Equation 6 return the first parameter, then the min operator of Equation 2 also returns the first parameter, and the result of both equations is exactly the same. That is, Equation 6 reduces to Equation 2, since $$\frac{a_1}{b_1} \times \frac{b_1}{c_1} = \frac{a_1}{c_1}.$$

Analogously, if both min operators of Equation 6 return the second parameter, then the min operator of Equation 2 returns the second parameter, and the result of Equations 2 and 6 is the same. That is, Equation 6 reduces to Equation 2, since $$\frac{a_2}{b2} \times \frac{b_2}{c_2} = \frac{a_2}{c_2}.$$

However, if the first min operator of Equation 6 returns the first parameter, and the second min operator of Equation 6 returns the second parameter, both equations might return different values. That is, Equation 6 does not reduce to Equation 2, since, in general, $$\frac{a_1}{b_1} \times \frac{b_2}{c_2}$$

is different from either $$\frac{a_1}{c_1} \text{ or } \frac{a_2}{c_2}.$$

Similarly, if the first min operator of Equation 6 returns the second parameter, and the second min operator of Equation 6 returns the first parameter, both equations might return different values. Again, Equation 6 doe not reduce to Equation 2, since $$\frac{a_2}{b_2} \times \frac{b_1}{c_1}$$

is in general different from either $$\frac{a_1}{c_1} \text{ or } \frac{a_2}{c_2}.$$

In such cases, Equation 6 provides a tighter upper bound than Equation 2 and is thus more accurate. The following example query illustrates how this situation arises:

EXAMPLE

SELECT*FROM part, supplier, lineitem
WHERE
p_partkey=l_partkey AND
s_suppkey=l_suppkey AND
p_name like '% green'
OPTION (force order)

In the example, the database TPC-H is used. The following values are obtained from the TPC-H database where S=supplier, P=part, and L=lineitem.
$card_S$=1000, $\delta_{S.suppkey}$=1
$card_P$=20000, $\delta_{P.partkey}$=1
$card_L$=600000, $\delta_{L.partkey,suppkey}$=7.5, $\delta_{L.partkey}$=30, $\delta_{L.suppkey}$=600

The filter $\sigma_{pname\ like\ 'green'}$ returns the following information where $\sigma_{green}P$ is denoted $\sigma P$:
$card_{\sigma P}$=200, $\delta_{\sigma P.partkey}$=1

After applying the Cartesian product, it can be estimated (denoting "S×σP" as x) that
$card_x$=1000*200=200000
$\delta_{x.partkey,suppkey}$=1 (it is the product of the original densities).
$\delta_{x.partkey}$=1000 (since each distinct partkey value was combined with all 1000 suppliers).

$\delta_{x.suppkey}$=200 (since each distinct suppkey value was combined with all 200 green parts).

All the information in the above example can be derived from the Cartesian product alone, without considering key information. This information can be used to estimate the size of the join $L\bowtie_{partkey=partkey \wedge suppkey=suppkey} x$. If the multi-column densities $\delta_{L.partkey,suppkey}$ and $\delta_{x.partkey,suppkey}$ are used with Equation 2, the estimated cardinality is calculated as follows:

$$L\bowtie_{partkey=partkey \wedge suppkey=suppkey} x = \min\left(\frac{card_L}{\delta_{L.partkey,suppkey}} \cdot \frac{card_x}{\delta_{x.partkey,suppkey}}\right) \cdot \delta_{L.partkey.suppkey} \cdot \delta_{x.partkeys.uppkey}$$

$$= \min(600000/7*5, 200000/1)*7.5*1 = 80000*7.5 = 600,000$$

By applying Equation 6 it will be shown that 600,000 is an overestimate of the cardinality. The estimated cardinality using equation 6 multi-column densities $\delta_{L.partkey,suppkey}$ and $\delta_{x.partkey,suppkey}$, and the additional prefix density information $\delta_{L.partkey}$ and $\delta_{x.partkey}$ is calculated as follows:

$$L\bowtie_{partkey=partkey \wedge suppkey=suppkey} x = \min\left(\frac{card_L}{\delta_{L.partkey}} \cdot \frac{card_x}{\delta_{x.partkey}}\right) \min\left(\frac{\delta_{L.partkey}}{\delta_{L.partkey.suppkey}} \cdot \frac{\delta_{x.partkey}}{\delta_{x.partkey..suppkey}}\right) \cdot \delta_{L.partkey..suppkey} \cdot \delta_{x.partkey.suppkey}$$

$$= \min(600000/30, 200000/1000)*\min(30/7.5, 1000/1)*7.5*1$$

$$= \min(20000, 200)*\min(4, 1000)*7.5*1 = 200*4*7.5 = 6000$$

Note that the results of the first min operation is the second parameter, while the result for the second min operation is the first parameter. Had the other possible multi-column densities, i.e., $\delta_{L.suppkey,partkey}$ and $\delta_{x.suppkey,partkey}$, and the additional prefix density information $\delta_{L.suppkey}$ and $\delta_{x.suppkey}$, the cardinality is calculated as follows:

$$L\bowtie_{partkey=partkey \wedge suppkey=suppkey} x = \min\left(\frac{card_L}{\delta_{L.suppkey.}} \cdot \frac{card_x}{\delta_{x.suppkey.}}\right) \cdot \min\left(\frac{\delta_{L.suppkey}}{\delta_{L.suppkey..partkey.}} \cdot \frac{\delta_{L.suppkey}}{\delta_{x.suppkey..partkey}}\right) \cdot \delta_{L..suppkey..partkey} \cdot \delta_{x.suppkey.partkey}$$

$$= \min(600000/600, 200000/200)*\min(600/7.5, 200/1)*7.5*1$$

$$= \min(1000, 1000)*\min(80, 200)*7.5*1 = 1000*80*7.5 = 600,000$$

In the exemplary embodiment, the method takes the minimum over these two refined estimations (min(600000, 6000)=6000) to obtain the estimated cardinality estimation. The estimated cardinality returned in this example is an accurate estimation (the actual value obtained by running the query on TPC-H is 6629).

Extending the Method to Histograms

Figure 5:
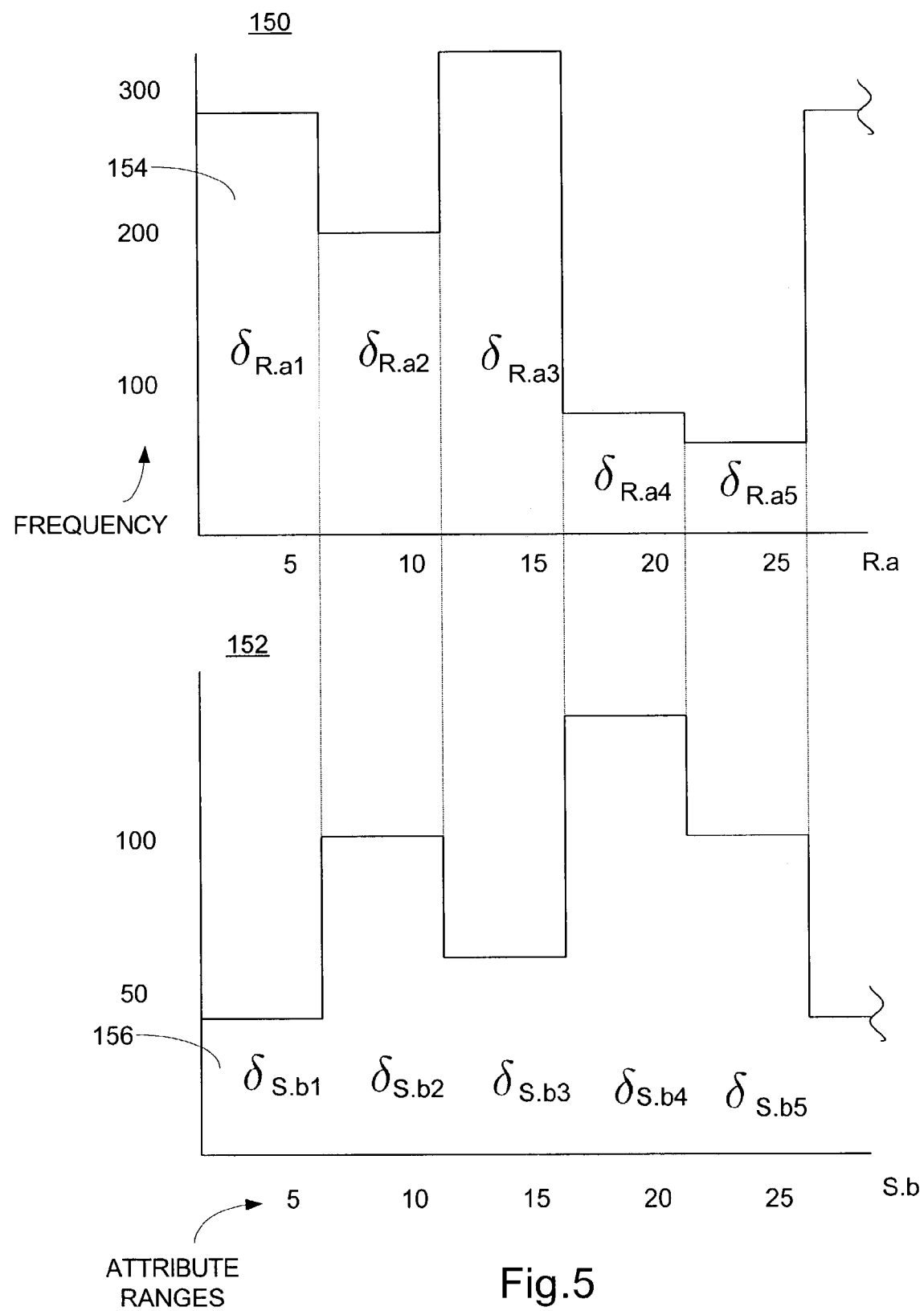
FIG. 5 illustrates a method of estimating the cardinality of a join of two relations using histograms and multi-column densities.

In one embodiment, the disclosed method of estimating cardinality using multi-column densities can be extended to histograms. Referring to FIG. 5, suppose a multi-column density over R.a, R.c is available, a multi-column density over S.b, S.d is available and histograms 150, 152 over R.a and S.b are also available. In one embodiment, the disclosed method can simply extend the information in each histogram bucket with the single value $\delta_{R.a,c}$ or $\delta_{S.b,d}$ coming from the multi-column densities. In this embodiment, each histogram bucket currently represents $\delta_{R.a}$ and $\delta_{S.b}$ duplicates for each distinct value of R.a and S.b respectively. In such a case, the method chooses to use an extended histogram as opposed to the multi-column density. The reasoning behind this decision is that more detailed information about one column (R.a) is available and no multi-column density information is lost, since the bucket information is extended with the multi-column density value.

Referring to FIG. 5, the buckets 154 of the histogram 150 for R.a are aligned with the buckets 156 of the histogram 152 for S.b. For each pair of buckets, the multi-column density values $\delta_{R.a,c}$, $\delta_{S.b,d}$ and the information in the pair of buckets (number of tuples in each bucket, density of each bucket) can be used in Equation 7 to calculate the cardinality for the pair of buckets. The results for the pairs of buckets are added together to estimate the cardinality of the join.

While the present invention has been described with a degree of particularity, it is the intent that the invention include all modifications and alterations falling within the spirit or scope of the appended claims.

The invention claimed is:

1. A method of estimating cardinality of a join of tables using multicolumn density values, comprising:
   identifying a number of distinct combination tuples, the combination tuples containing a combination of values of a plurality of attributes for each table;
   determining a number of duplicates for each identified distinct combination tuple;
   identifying a number of distinct subset tuples containing a value of a subset of the plurality of attributes for each table;
   determining a number of duplicates for each identified subset tuple;
   estimating a number of tuples from each table that participate in the join using a subset density factor, the subset density factor being equal to the determined number of duplicates for each identified subset tuple divided by the determined number of distinct subset tuples containing a value of a subset of the plurality of attributes for each table;
   estimating the cardinality of the join using a combination density factor for each table and the estimated number of tuples that participate in the join from each table, the combination density factor being equal to the determined number of duplicates for each identified distinct combination tuple divided by the determined number of distinct combination tuples containing a combination of values of a plurality of attributes for each table;

outputting the estimated cardinality of the join.

2. The method of claim 1 wherein estimating a number of tuples of one of the tables that participate in the join comprises estimating a number of distinct values of a subset of the plurality of attributes in a first table, estimating a number of distinct values of a subset of the plurality of attributes in a second table, and multiplying the subset density factor of the attributes in each table by a minimum of the estimated numbers of distinct values.

3. The method of claim 2 wherein the number of distinct values of a subset of said plurality of attributes in a table is calculated by dividing the cardinality of the table by the subset density factor of attributes in the table.

4. The method of claim 1 wherein said estimating cardinality comprises selecting the minimum of an estimated number of tuples from a first table that participate in the join divided by the combination density factor over the plurality of attributes for the first table and an estimated number of tuples from a second table that participate in the join divided by the combination density over the plurality of attributes for the second table and multiplying said minimum, said combination density factor over the plurality of attributes for the first table, and said combination density factor over the plurality of attributes for the second table.

5. The method of claim 1 wherein said subset density factor comprises prefixes of said set of attributes.

6. The method of claim 1 wherein densities of a plurality of subsets of the set of attributes are used to calculate a plurality of cardinality estimations and a minimum of the plurality of cardinality estimations is selected as the cardinality estimation for the join.

7. A computer readable storage medium having computer executable instructions stored thereon for performing a method of estimating cardinality of a join of tables using multicolumn density values, the method comprising:

identifying a number of distinct combination tuples, the combination tuples containing a combination of values of a plurality of attributes for each table;

determining a number of duplicates for each identified distinct combination tuple;

identifying a number of distinct subset tuples containing a value of a subset of the plurality of attributes for each table;

determining a number of duplicates for each identified subset tuple;

estimating a number of tuples from each table that participate in the join using a subset density factor, the subset density factor being equal to the determined number of duplicates for each identified subset tuple divided by the determined number of distinct subset tuples containing a value of a subset of the plurality of attributes for each table;

estimating the cardinality of the join using a combination density factor for each table and the estimated number of tuples that participate in the join from each table, the combination density factor being equal to the determined number of duplicates for each identified distinct combination tuple divided by the determined number of distinct combination tuples containing a combination of values of a plurality of attributes for each table; and outputting the estimated cardinality of the join.

8. The computer readable storage medium of claim 7 wherein estimating a number of tuples of one of the tables that participate in the join comprises estimating a number of distinct values of a subset of the plurality of attributes in a first table, estimating a number of distinct values of a subset of the plurality of attributes in a second table, and multiplying the subset density factor of the attributes in each table by a minimum of the estimated numbers of distinct values.

9. The computer readable storage medium of claim 8 wherein the number of distinct values of a subset of said plurality of attributes in a table is calculated by dividing the cardinality of the table by the subset density factor of attributes in the table.

10. The computer readable storage medium of claim 7 wherein said estimating cardinality comprises selecting the minimum of an estimated number of tuples from a first table that participate in the join divided by the combination density factor over the plurality of attributes for the first table and an estimated number of tuples from a second table that participate in the join divided by the combination density over the plurality of attributes for the second table and multiplying said minimum, said combination density factor over the plurality of attributes for the first table, and said combination density factor over the plurality of attributes for the second table.

11. The computer readable storage medium of claim 7 wherein said subset density factor comprises prefixes of said set of attributes.

12. The computer readable storage medium of claim 7 wherein densities of a plurality of subsets of the set of attributes are used to calculate a plurality of cardinality estimations and a minimum of the plurality of cardinality estimations is selected as the cardinality estimation for the join.

13. A computer readable storage medium having computer executable instructions stored thereon for performing a method of estimating cardinality of a join of tables using multicolumn density values, the method comprising:

identifying a number of distinct combination tuples, the combination tuples containing a combination of values of a plurality of attributes for each table;

determining a number of duplicates for each identified distinct combination tuple;

identifying a number of distinct subset tuples containing a value of a subset of the plurality of attributes for each table;

determining a number of duplicates for each identified subset tuple;

identifying a cardinality of each table;

estimating the cardinality of the join using a combination density factor for each table, a subset density factor of the plurality of attributes for each table, and the cardinality of each table, wherein the combination density factor is equal to the determined number of duplicates for each identified distinct combination tuple divided by the determined number of distinct combination tuples containing a combination of values of the plurality of attributes for each table and the subset density factor is equal to the determined number of duplicates for each identified subset tuple divided by the determined number of distinct subset tuples containing a value of a subset of the plurality of attributes for each table; and outputting the estimated cardinality of the join.

14. The computer readable storage medium of claim 13 wherein the method further comprises estimating a number of tuples from each table that participate in the join using the subset density factor and cardinalities of the tables and wherein the cardinality of the join is estimated using the combination density factor for each table and the estimated number of tuples that participate in the join from each table.

15. The computer readable storage medium of claim 14 wherein estimating a number of tuples of one of the tables that participate in the join comprises estimating a number of distinct values of a subset of the plurality of attributes in a first table, estimating a number of distinct values of a subset of the plurality of attributes in a second table, and multiplying the subset density factor of the attributes in each table by a minimum of the estimated numbers of distinct values.

16. The computer readable storage medium of claim 14 wherein the number of distinct subset tuples in a table is calculated by dividing the cardinality of the table by the subset density factor of the subset of attributes in the table.

17. The computer readable storage medium of claim 14 wherein said estimating cardinality comprises selecting a minimum of an estimated number of tuples from a first table that participate in the join divided by the combination density factor over the plurality of attributes for the first table and an estimated number of tuples from a second table that participate in the join divided by the combination density factor over the plurality of attributes for the second table and multiplying said minimum, said combination density factor over the plurality of attributes for the first table, and said combination density factor over the plurality of attributes for the second table.

18. The computer readable storage medium of claim 13 wherein said subset density factor comprises prefixes of said set of attributes.

19. The computer readable storage medium of claim 13 wherein estimating the cardinality comprises identifying a first minimum of a cardinality of a first table divided by the subset density factor of the subset of said plurality of attributes for the first table and a cardinality of a second table divided by the subset density factor of the subset of said plurality of attributes for the second table, identifying a second minimum of said subset density factor of said subset of said set of attributes for the first table divided by the combination density factor over said plurality of attributes for the first table and said subset density factor of said subset of said plurality of attributes for the second table divided by the combination density factor over said plurality of attributes for the second table, and multiplying said first minimum, said second minimum, said combination density over said plurality of attributes for the first table, and said combination density factor over said plurality of attributes for the second table.

20. The computer readable storage medium of claim 13 wherein subset density factors of a plurality of subsets of the plurality of attributes are used to calculate a plurality of cardinality estimations and a minimum of the plurality of cardinality estimations is selected as the cardinality estimation for the join.

* * * * *